United States Patent
Zentz et al.

(10) Patent No.: US 10,802,757 B2
(45) Date of Patent: Oct. 13, 2020

(54) AUTOMATED MANAGEMENT OF WRITE STREAMS FOR MULTI-TENANT STORAGE

(71) Applicant: EMC IP Holding Company LLC, Hopkinton, MA (US)

(72) Inventors: Dustin Hunt Zentz, Northborough, MA (US); Owen Martin, Hopedale, MA (US); Adnan Sahin, Needham, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 168 days.

(21) Appl. No.: 16/048,724

(22) Filed: Jul. 30, 2018

(65) Prior Publication Data

US 2020/0034076 A1    Jan. 30, 2020

(51) Int. Cl.
  *G06F 3/06*    (2006.01)
  *G06F 12/10*   (2016.01)

(52) U.S. Cl.
  CPC .......... *G06F 3/0659* (2013.01); *G06F 3/0604* (2013.01); *G06F 3/0689* (2013.01); *G06F 12/10* (2013.01); *G06F 2212/1016* (2013.01); *G06F 2212/657* (2013.01)

(58) Field of Classification Search
  CPC .... G06F 3/0659; G06F 3/0604; G06F 3/0689; G06F 3/0644; G06F 3/0638; G06F 3/0653; G06F 3/0679; G06F 12/10; G06F 12/0246; G06F 2212/1016; G06F 2212/657
  See application file for complete search history.

(56) References Cited

U.S. PATENT DOCUMENTS

| | | |
|---|---|---|
| 7,949,637 B1 | 5/2011 | Burke |
| 8,856,397 B1 | 10/2014 | Marshak et al. |
| 9,152,349 B2 | 10/2015 | Yochai |
| (Continued) | | |

OTHER PUBLICATIONS

Yang, Jingpei et al, AutoStream: Automatic Stream Management for Multi-streamed SSDs, May 2017, Association for Computing Machinery, International Systems and Storage Conference, pp. 1-11 (Year: 2017).*

(Continued)

*Primary Examiner* — Michael Krofcheck
(74) *Attorney, Agent, or Firm* — Muirhead and Saturnelli, LLC

(57) ABSTRACT

Techniques for processing I/O operations may include: randomly assigning extent identifiers of extents to RAID groups; receiving write activity information for the extents for a sampling period; for each of the RAID groups, performing stream detection processing in accordance with the first write activity information and determining stream groups, wherein each stream group of one of the RAID groups includes extents of the RAID group belonging to a same write stream in the RAID group, wherein stream groups across all RAID groups are uniquely identified using stream group identifiers; tagging a write operation directed to one of the extents with a first stream group identifier denoting a stream group including the one extent; and issuing the write operation to a solid state drive of one of the RAID groups. Stream detection may use K-Means clustering algorithm. An aggregate address range of logical devices is mapped to the extent identifiers.

20 Claims, 13 Drawing Sheets

(56) References Cited

U.S. PATENT DOCUMENTS

| | | | | |
|---|---|---|---|---|
| 2003/0115282 | A1* | 6/2003 | Rose | H04L 29/06 |
| | | | | 709/214 |
| 2010/0057990 | A1* | 3/2010 | Mizuno | G06F 3/061 |
| | | | | 711/114 |
| 2015/0205663 | A1* | 7/2015 | Sundaram | G06F 3/0619 |
| | | | | 714/6.24 |
| 2016/0231948 | A1* | 8/2016 | Gupta | G06F 3/0653 |
| 2016/0357776 | A1* | 12/2016 | Sundaram | G06F 3/0688 |
| 2017/0017663 | A1* | 1/2017 | Huo | G06F 12/0246 |
| 2017/0228157 | A1* | 8/2017 | Yang | G06F 3/0611 |
| 2017/0242788 | A1* | 8/2017 | Ahmed | G06F 3/0643 |
| 2017/0344491 | A1* | 11/2017 | Pandurangan | G06F 12/1009 |

OTHER PUBLICATIONS

Changho Choi, "AutoStream: Automatic Stream Management for Multi-stream SSDs in Big Data Era," Samsung Semiconductor, Inc., Santa Clara, 2017.

Samsung, "Maximizing Data Center and Enterprise Storage Efficiency," https://www.samsung.com/us/labs/pdfs/collateral/Samsung_Autostream_Technology_Brief_v12.pdf, 2017.

* cited by examiner

AUTOMATED MANAGEMENT OF WRITE STREAMS FOR MULTI-TENANT STORAGE

BACKGROUND

Technical Field

This application generally relates to data storage and, in particular, processing performed in connection with data written to physical storage devices.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell EMC™. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of processing I/O operations comprising: randomly assigning a plurality of extent identifiers to a plurality of RAID groups, wherein each of the plurality of extent identifiers denotes a different one of a plurality of extents; receiving first write activity information for the plurality of extents for a first sampling period; for each of the plurality of RAID groups, performing stream detection processing in accordance with the first write activity information and determining a plurality of stream groups, wherein each of the plurality of stream groups for each of the plurality of RAID groups includes extents of said each RAID group belonging to a same write stream in said each RAID group, wherein each of the plurality of stream groups of each of the plurality of RAID groups is uniquely identified using one of a plurality of stream group identifiers; tagging a write operation directed to one of the plurality of extents with a first of the plurality of stream group identifiers denoting a stream group including the one extent; and issuing the write operation to a solid state drive of one of the plurality of RAID groups. The stream detection processing for a first of the plurality of RAID groups may include determining, using a clustering algorithm and in accordance with the first write activity information, a plurality of clusters of extents of the first RAID group, wherein each of the plurality of clusters of extents of the first RAID group identifies a different write stream of extents of the first RAID group. The clustering algorithm may be a k-means clustering algorithm. Each of the plurality of clusters of extents of the first RAID group may include extents of the first RAID group determined by the clustering algorithm as similar with respect to a plurality of dimensions. The plurality of dimensions may include extent identifier and write activity. Each of the plurality of clusters of extents of the first RAID group may include extents of the first RAID group determined by the clustering algorithm to have similar write activity and also similar locality of reference based on extent identifiers associated with extents of said each cluster. The first write activity information for each of the plurality of extents may include an amount of data written to said each extent per unit of time during the first sampling period. The method may include: forming an aggregate LBA (logical block address range) across contiguous LBA ranges of a plurality of logical devices; and sequentially mapping portions of the aggregate LBA range to an extent range of the plurality of extent identifiers. A plurality of write operations may include the write operation and each of the plurality of write operations may be tagged with the first stream group identifier, and the method may include issuing the plurality of writes to the solid state drive that stores write data from the plurality of write operations in a same allocation block. The method may include: receiving second write activity information for the plurality of extents for a second sampling period subsequent to the first sampling period; for each of the plurality of RAID groups, performing stream detection processing in accordance with the second write activity information and determining a second plurality of stream groups, wherein each of the second plurality of stream groups for each of the plurality of RAID groups includes extents of said each RAID group belonging to a same write stream in said each RAID group, wherein each of the second plurality of stream groups of each of the plurality of RAID groups is uniquely identified using one of the plurality of stream group identifiers; tagging a second write operation directed to a second of the plurality of extents with a second of the plurality of stream group identifiers denoting a stream group including the second extent; and issuing the second write operation to the solid state drive. Each of the plurality of extents assigned to each of the plurality of RAID groups may be striped across all physical storage devices of said each RAID group.

In accordance with another aspect of techniques herein is a system comprising: a processor; and a memory comprising code stored thereon that, when executed, performs a method of processing I/O operations comprising: randomly assigning a plurality of extent identifiers to a plurality of RAID groups, wherein each of the plurality of extent identifiers denotes a different one of a plurality of extents; receiving first write activity information for the plurality of extents for a first sampling period; for each of the plurality of RAID groups, performing stream detection processing in accordance with the first write activity information and determining a plurality of stream groups, wherein each of the plurality of stream groups for each of the plurality of RAID groups includes extents of said each RAID group belonging to a same write stream in said each RAID group, wherein each of the plurality of stream groups of each of the plurality of RAID groups is uniquely identified using one of a plurality of stream group identifiers; tagging a write operation directed to one of the plurality of extents with a first of the plurality of stream group identifiers denoting a stream group including the one extent; and issuing the write operation to a solid state drive of one of the plurality of RAID groups.

In accordance with another aspect of techniques herein is a computer readable medium comprising code stored thereon that, when executed, performs a method of processing I/O operations comprising: randomly assigning a plurality of extent identifiers to a plurality of RAID groups, wherein each of the plurality of extent identifiers denotes a different one of a plurality of extents; receiving first write activity information for the plurality of extents for a first sampling period; for each of the plurality of RAID groups, performing stream detection processing in accordance with the first write activity information and determining a plurality of stream groups, wherein each of the plurality of stream groups for each of the plurality of RAID groups includes extents of said each RAID group belonging to a same write stream in said each RAID group, wherein each of the plurality of stream groups of each of the plurality of RAID groups is uniquely identified using one of a plurality of stream group identifiers; tagging a write operation directed to one of the plurality of extents with a first of the plurality of stream group identifiers denoting a stream group including the one extent; and issuing the write operation to a solid state drive of one of the plurality of RAID groups. The stream detection processing for a first of the plurality of RAID groups may include determining, using a clustering algorithm and in accordance with the first write activity information, a plurality of clusters of extents of the first RAID group, wherein each of the plurality of clusters of extents of the first RAID group identifies a different write stream of extents of the first RAID group. The clustering algorithm may be a k-means clustering algorithm. Each of the plurality of clusters of extents of the first RAID group may include extents of the first RAID group determined by the clustering algorithm as similar with respect to a plurality of dimensions. The plurality of dimensions may include extent identifier and write activity. Each of the plurality of clusters of extents of the first RAID group may include extents of the first RAID group determined by the clustering algorithm to have similar write activity and also similar locality of reference based on extent identifiers associated with extents of said each cluster. The first write activity information for each of the plurality of extents may include an amount of data written to said each extent per unit of time during the first sampling period. The method may include forming an aggregate LBA (logical block address range) across contiguous LBA ranges of a plurality of logical devices; and sequentially mapping portions of the aggregate LBA range to an extent range of the plurality of extent identifiers.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
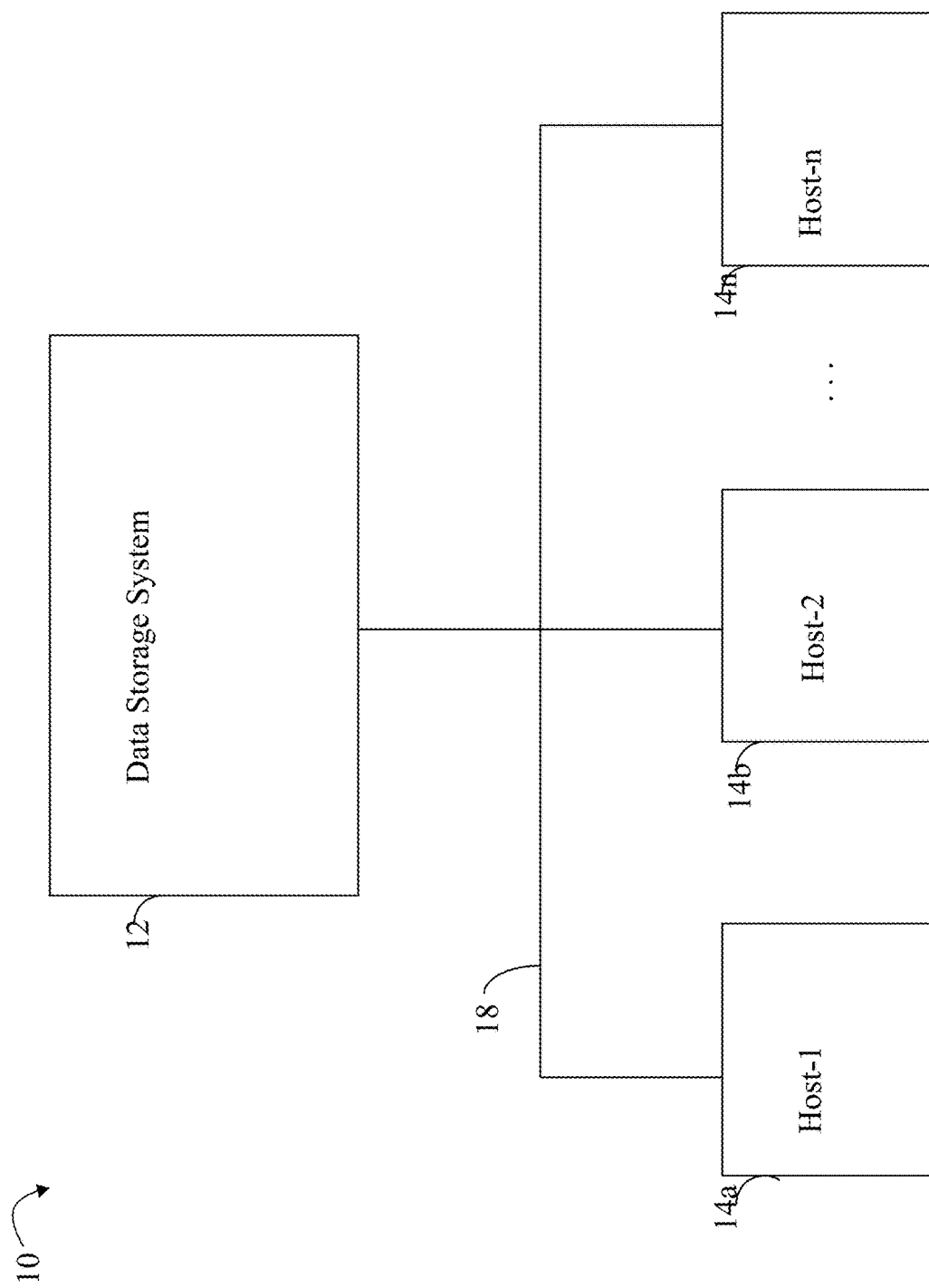
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
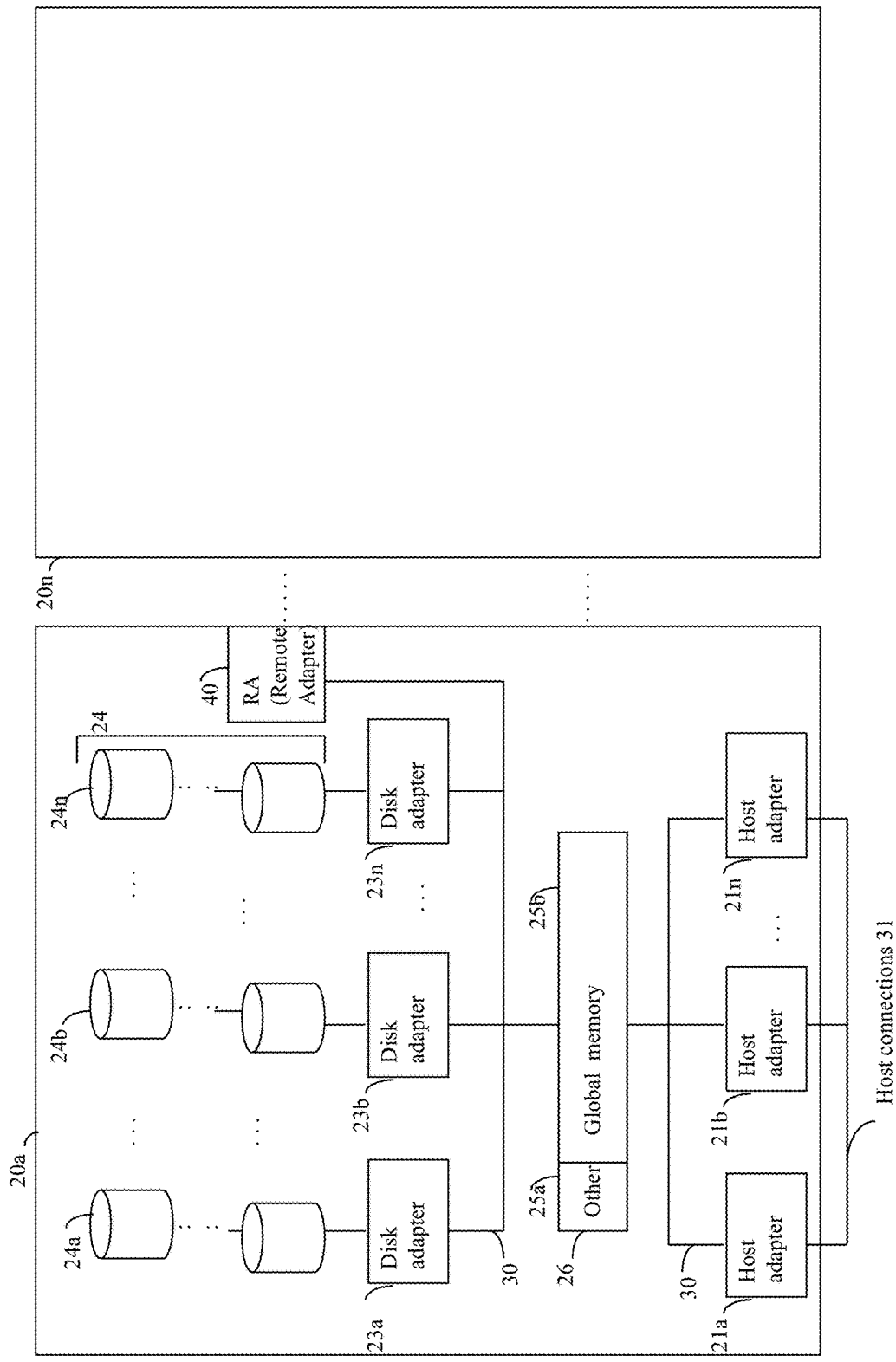
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable nonvolatile storage such as, for example, rotating disk drives, flash-based drives or more generally solid state drives (SSDs), and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

Figure 2B:
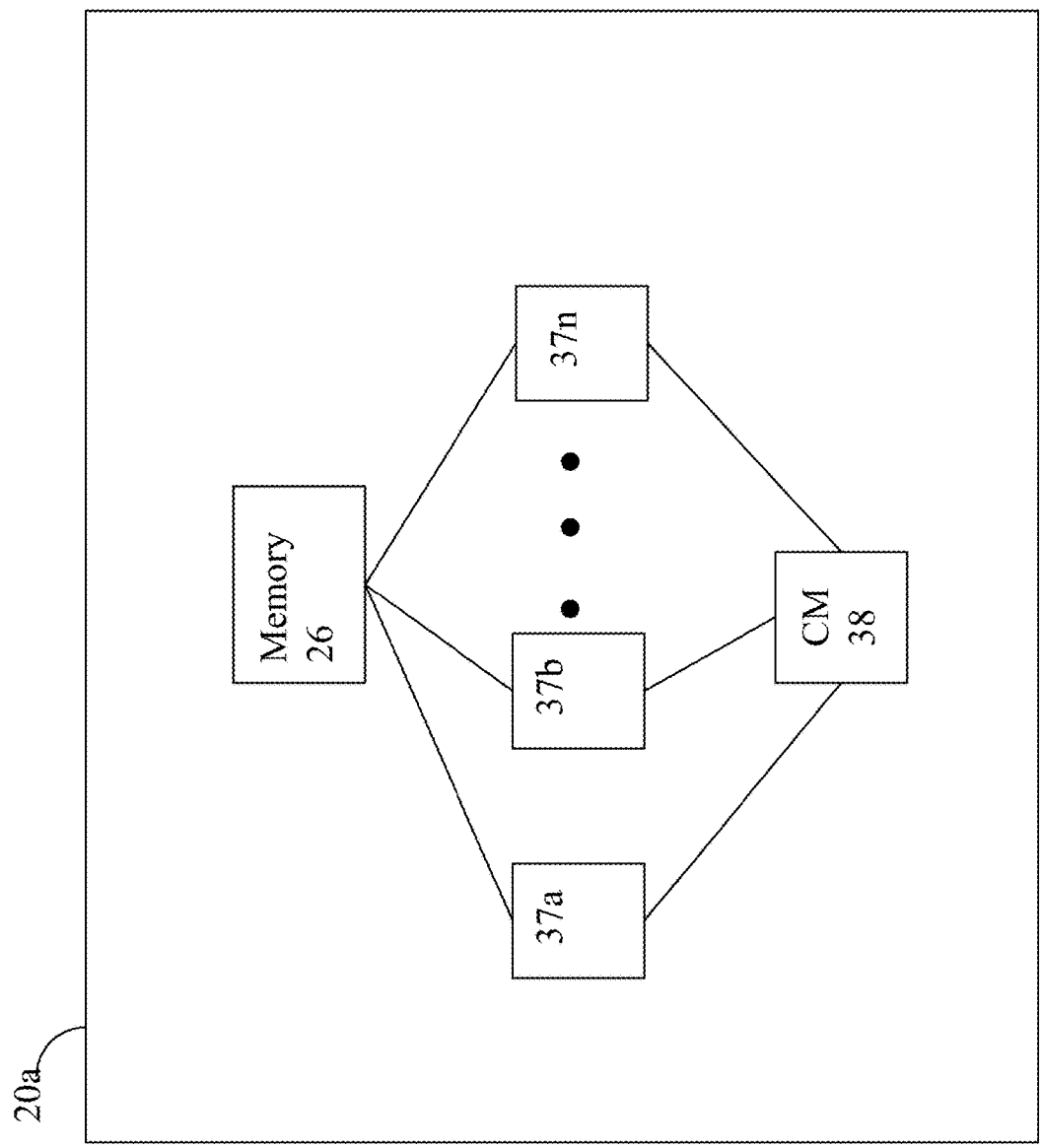
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

An embodiment of a data storage system used with techniques herein may support one or more types of logical devices. For example, at least one embodiment may support and use both thick or regular logical devices as well thin or virtually provisioned logical devices. A thin device is a type of logical device where units of storage are progressively allocated on an as-needed basis. Typically, the base units of storage are provisioned from multiple sets of PDs organized as RAID groups, where these groups are partitioned into small portions sometimes referred to as slices, chunks, and the like. There is a mapping provided to relate the logical address in a thin device to the particular slice or chunk of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US; U.S. Pat. No. 7,949,637, Issued May 24, 2011, STORAGE MANAGEMENT FOR FINE GRAINED TIERED STORAGE WITH THIN PROVISIONING, Burke; and U.S. Pat. No. 8,856,397, Issued Oct. 7, 2014, TECHNIQUES FOR STATISTICS COLLECTION IN CONNECTION WITH DATA STORAGE SYSTEM PERFORMANCE, to Marshak, et al., all of which are incorporated by reference herein.

RAID (redundant array of independent disks) groups are known in the art and refer to a group of multiple PDs or drive members having a specified RAID level and associated configuration providing data protection in case of failure of one of the PDs in the RAID group. RAID levels known in the art may include, for example, RAID-1 (e.g., where data is mirrored on different PDs of the RAID group, RAID-5 (e.g., where data and parity information is stored on PDs of the RAID group), and the like.

An embodiment in accordance with techniques herein may provide for logical devices that are thin or virtually provisioned devices along with thick or regular logical devices. A thick or regular logical device is presented as having a particular storage capacity (e.g., such as to a host, application executing on the host, or other data storage system client) where physical storage is provisioned (allocated or bound) for the entire logical device storage capacity when the thick device is configured.

An embodiment of a data storage system may operate in accordance with one or more storage protocols or standards, such as the SCSI standard or protocol or the NVMe (Non-Volatile Memory Express) standard or protocol. Write Streams are features included in standards, such as the NVMe and SCSI standards, for use with SSDs, such as those providing non-volatile backend physical storage on the data storage system. Write Streams generally allow write commands to an SSD to be tagged with an identifier which is used to optimize data placement of the write data on the storage media of the SSD. The identifier may be assigned to a write stream where a group of related data segments have the same identifier. Related data having the same identifier may be grouped together so that when writing to SSD physical media, processing by the SSD places related data (having the same identifier) together, such as in the same allocated block, so that such data may also be erased together as a group. Thus, data associated with the same Write Stream is expected to be invalidated (e.g., via a data operation such as update/write, deallocation, etc.) at the same time. Use of Write Streams allows for SSD block allocation where related data having a similar expected data lifetime may be placed in the same erase block thereby reducing write amplification (e.g., such as due to rewriting data and garbage collection when performing space reclamation). Write Streams are intended to improve the performance and endurance of an SSD over its lifetime.

The problem of identifying Write Streams can be fairly straightforward if managed by a single host or application. An application may associate write commands from each one of its components with a different Write Stream. For example, writes generated by an application's database, metadata, and log files could all belong to different Write Streams. At a higher level, a single host running multiple applications may associate each application with a different Write Stream. For example, LBAs of a logical device written to by a single host or application may be having similar logical address proximity and update frequency may be assigned to the same Write Stream since such LBAs are likely to be written and thus invalidated at the same time.

In contrast to a single host or application, implementation and use of Write Streams on a data storage system, such as data storage array, has increased complexity. A data storage system array typically support and provides storage for multiple hosts, each potentially running multiple applications, or virtual machines, which are issuing I/O across multiple logical devices. The storage system may be ignorant or unaware as to which application any given data chunk being written belongs. The storage system manages its own logical to physical data mapping, as well as load balancing across many physical storage devices, which further obfuscates the host-application-data association. Furthermore, it may be desirable to perform this in an automated manner in which I/Os are not required to be tagged by the application or host. For these reasons, an alternative approach is described in following paragraphs which provides for more effective utilize of Write Streams within a data storage system environment.

The data storage system may include many logical devices exposed to the hosts, or more generally clients, where all such logical devices are to be used with techniques herein. Each of the logical devices (e.g., thin logical devices, thick or regular logical devices, and possibly other supported logical device types) has its own logical address range of [0, N−1], where N is a non-zero positive integer and varies per logical device capacity and generally denotes the maximum logical address for that particular configured logical device. Storage for the logical devices are spread across multiple physical drives (e.g., PDs) within RAID groups. Additionally, the system performs processing that attempts to distribute the allocation of data evenly across all PDs of all RAID groups in the system to achieve consistent performance and alleviate bottlenecks. To protect against data corruption or data loss in the case of component failures (e.g., PD drive failure), logical device are partitioned into multiple segments of contiguous logical address regions where such segments are also referred to as extents herein. In at least one embodiment, the Extent is the unit of granularity for RAID recovery, and is striped across all drives in a RAID group (e.g., PDs or RAID group members), along with XOR parity information calculated from the Extent's contents.

To enable a viable solution for the detection of Write Streams in a data storage system environment in at least one embodiment in accordance with techniques herein, an extent allocation scheme described in following paragraphs may be used. Each logical device (LDEV) has a unique identifier, 'LDEV ID', in the range [0-LDEV_MAX-1], where the total number of logical devices in the system, or more generally used with techniques, herein, is LDEV_MAX+1 (LDEV_MAX being a positive integer greater than 0; since the LDEV ID range is zero-based). The LBAs from each LDEV may be appended, in order of LDEV ID, and mapped into an aggregate logical address space for the data storage system front-end interface. This aggregate LBA region is then split up into evenly sized Extents, each having size 'E_BLOCKS' (in number of logical data blocks). 'E_BLOCKS' generally denotes the number of LBAs or logical blocks in each extent and E_BLOCKS may generally be any positive integer greater than 0. Each extent is then assigned a unique identifier, 'Extent ID'. An LBA 'n' of the aggregate logical address space belongs to Extent ID 'E' if the floored quotient of 'n' divided by 'E_BLOCKS equals E. Based on the foregoing, the extent E of an LBA n may be expressed as:

$$E = \text{Floor (LBA } n/E\_BLOCKS) \qquad \text{EQUATION 1}$$

where Floor denotes the floored quotient. As known in the art and denoted by Floor in EQUATION 1, floored division is division where the fractional part (e.g., remainder) of the division operation is discarded and the result of the Floor is the integer portion (e.g., quotient) of the division operation.

Figure 3:
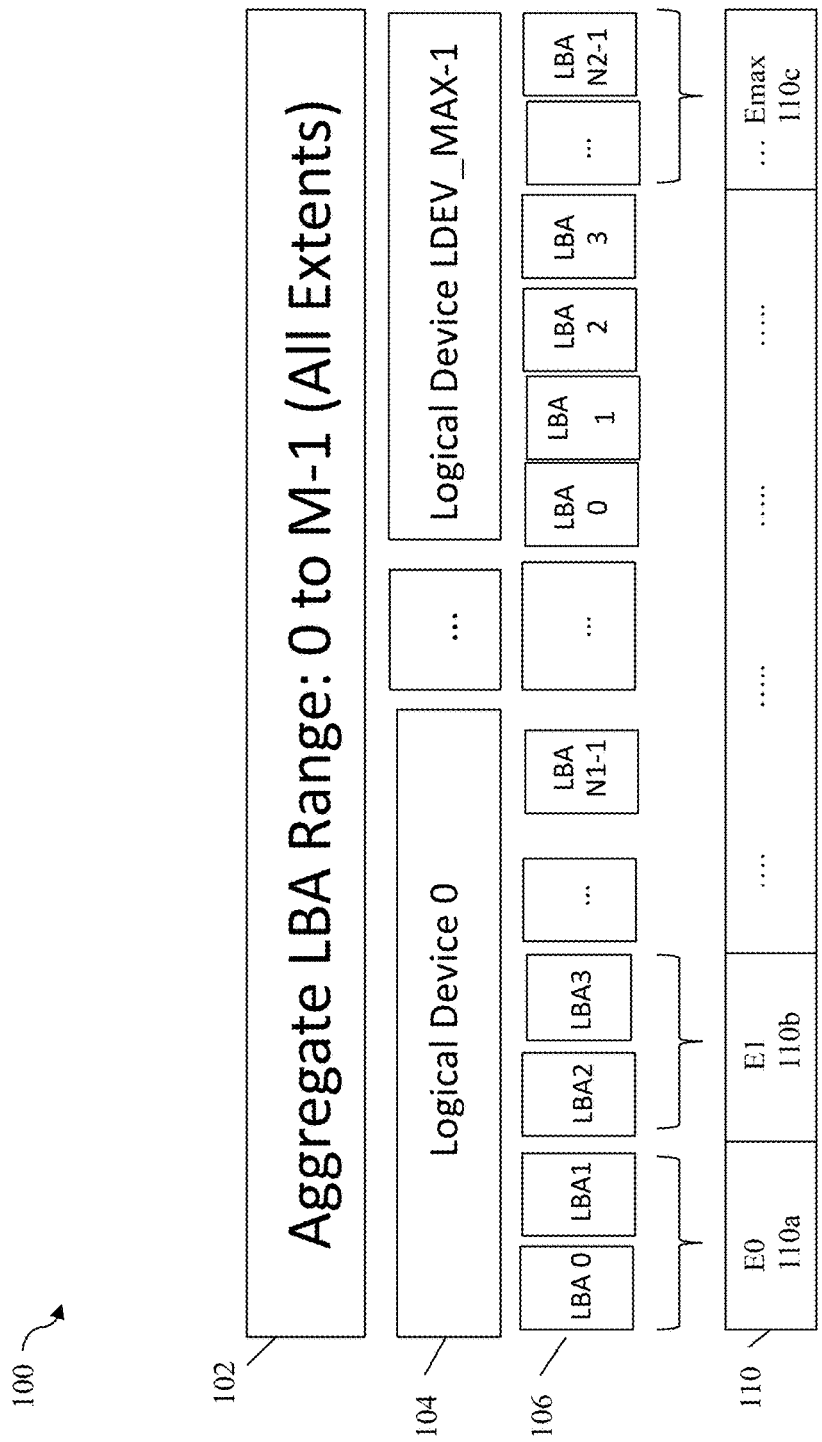
FIG. 3 is an example illustrating a mapping between an aggregate LBA range, logical device address ranges and extents in an embodiment in accordance with techniques herein.

Referring to FIG. 3, shown is an example 100 illustrating the aggregated LBA range used in an embodiment in accordance with techniques herein. The example 100 includes the aggregated LBA range 102, 104 denoting the appended list of logical devices 0 through LDEV_MAX−1, and 106 denotes the appended LBA ranges of all logical devices 0 through LDEV_MAX−1. In this example, there are LDEV_MAX−1 logical devices having logical address ranges of 106 which are aggregated. Row or layer 106 indicates that logical device 0 has LBA range [0,N1-1] and that logical device LDEV_MAX−1 has LBA range [0, N2-1]. Element 102 indicates that the aggregated logical address or LBA range, across all logical devices 104, is [0 . . . M−1]. The aggregated LBA range 102, and thus also the appended LBA ranges 106, are partitioned into evenly sized extents over extent range E0 through Emax as denoted by extent range 110, where each extent is a number of one or more blocks or LBAs. Generally, extent IDs may be sequentially assigned as Ei, where "i" is a positive integer in this example and "i" is thus incremented sequentially as each extent ID is assigned to the next consecutive and contiguous number of LBAs. For example, as illustrated in FIG. 3 and denoted by E0 110a, E1 110b, and Emax 110c, each extent may be 2 blocks or LBAs, across the aggregated logical address space or LBA range 102. In a similar manner, the remaining LBAs of 102 and 106 may be partitioned into additional extents each having the same size (e.g., 2 blocks) as E0, E1 and Emax, wherein Emax denotes that last or maximum Extent ID in the Extent ID range [0, max] that is mapped onto the aggregate LBA range 102. In following paragraphs and discussion herein, extent IDs may also be noted by their "i" values ranging from 0 (e.g., E0) to "max" (e.g., Emax, denoting the last or maximum extent ID).

In FIG. 3, the extents IDs may be assigned in sequential order of their "i" values based on the sequentiality of the LBAs in the contiguous and consecutive aggregated LBA range 102. EQUATION 1 above may be used to map an LBA in the aggregated LBA range 102 to its corresponding extent ID Ei (e.g., where the extent Ei includes the mapped LBA n of the aggregated LBA range 102). Based on the foregoing, for example, LBA 0 of LDEV (logical device) 0 belongs to extent ID E0 and LBA N2-1 of LDEV_MAX−1 belongs to extent ID Emax.

Consistent with discussion herein, the logical devices of 104 denote the logical devices as presented or exposed by the data storage system to the hosts or clients, and thus the LBA ranges of 106 denote the LBA ranges of such logical device exposed by the data storage system to the hosts or clients. There may be one or more additional intervening logical device or mapping layers between an exposed logical device of 106 and the physical storage, such as RAID group layer providing the provisioned physical storage.

Each of the extent IDs may then be mapped to one of the RAID groups of PDs in the data storage system. Each RAID group in the system may be uniquely identified using a RAID group ID (identifier) and each of the extent IDs may be randomly mapped to, or assigned a RAID group ID. In at least one embodiment, a uniform random number generator may be used to randomly map or assign each extent ID to a RAID group ID. The foregoing random assignment of extent ID to RAID group ID ensures an even distribution of data allocated across each RAID group. An extent having an extent ID may have its storage allocated from (e.g., and data stored on) the randomly mapped or assigned RAID group ID. This random allocation provides for load balancing and even workload distribution across all RAID groups in the system, and thus across PDs of such RAID groups in the system. Using such random allocation provides for each RAID group having approximately the same amount of data stored thereon and also approximately the same amount of write activity or workload.

Figure 4:
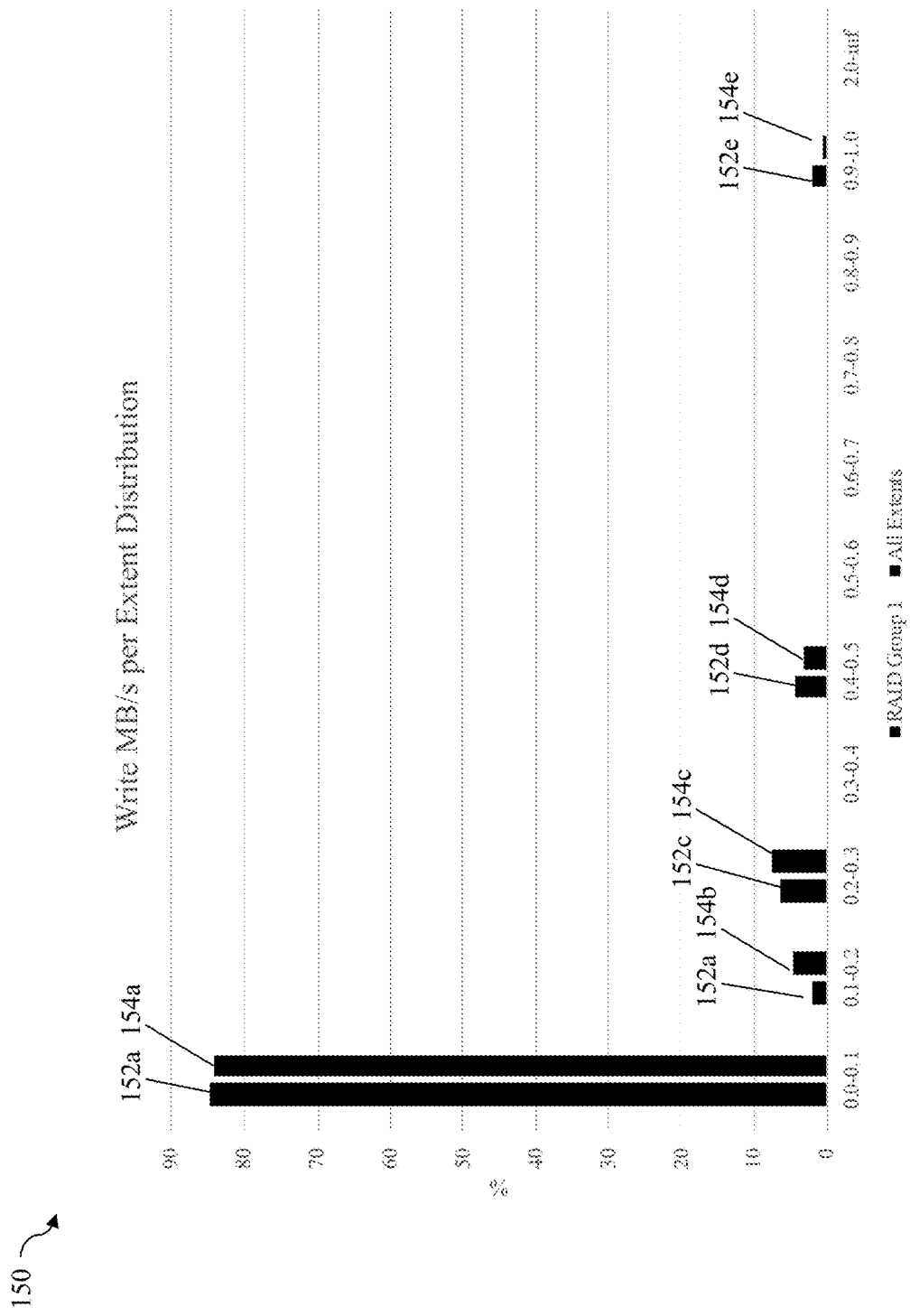
FIG. 4 is a graphical illustration of a distribution of write activity per extent as may be observed in an embodiment in accordance with techniques herein.

The inventors have confirmed through measurement and observation of write workload of the RAID groups that such random allocation and assignment of extent ID to RAID group ID achieves each RAID group having approximately the same amount of data stored thereon and also approximately the same amount of write activity or workload. In particular, the inventors observed that a sufficiently sized uniform random sampling of Extents across the full aggregate LBA range yields similar distributions of workload characteristics as the full set of all Extents. With this method of allocation, each drive shares approximately equal amounts of data and I/O load as all others. For example, reference is made to the graph 150 of FIG. 4 where percentages of total workload are on the Y axis, and different average write rates per extent in write MB (megabytes)/second per extent illustrated on the X axis. Thus, FIG. 4 is a graph showing the different write workloads (X axis buckets, bins or ranges) and the percentage of total workload (Y value) that was observed for each such X axis bucket, bin or range. In FIG. 4, elements 152a-e denote the percentages of total I/O workload (Y axis) for the different write workloads or write activity rates per extent (X axis) observed for a single randomly selected RAID group, RAID GROUP 1; and elements 154a-e denote the percentages of total I/O workload (Y axis) for the different write workloads or activity rates per extent (X axis) observed for all extents of the aggregate LBA range 102. From FIG. 4, it can be seen that workload percentages or distribution denoted by 152a-e are respectively similar to 154a-e.

Processing is performed to gather I/O statistics on each extent. Such periodic sample may be performed at the occurrence of each sampling period or window. In at least one embodiment, during a periodic sampling window of T seconds, read and write I/O statistics are recorded and maintained for each extent for all read and writes directed to each different extent. For techniques herein, the metric utilized for Stream Grouping is average write MB/second, denoting the average amount of data written per second to each extent where the amount of data is expressed in MB units. For each extent, a counter may be maintained that records the amount of data (in number of MBs) written to the extent during the sample period of T seconds. The metric used with techniques herein for the extent may then divide the counter value of the number of MBs written to the extent during the sampling period by the number of seconds, T, in the sampling period.

Processing is performed to manage Write Streams per RAID group, or at the RAID group level (e.g., for each RAID group ID). To manage extents at the RAID group level, logical entities referred to herein as Stream Groups are created. A Stream Group may be characterized as a collection of extents belonging to the same RAID group and also have the same Write Stream ID. Extents having the same Write Stream ID have similar locality of reference and similar write activity detected during the sampling period. Thus, for a single RAID group, a Stream Group denotes the extents of the single RAID group having similar locality of reference (e.g., depending on the particular algorithm used to determine Stream Groups, extent IDs may be relatively close to one another in the Extent ID range such as based on Euclidian distance where all extents in the same Stream Group may be within a particular distance window of one another), and having similar write activity (e.g., all extents may have approximately the same write activity within a particular window or range depending on the particular algorithm used to determine Stream Groups). An embodiment may determine similarities among different extents with respect to locality of reference and write activity in any suitable manner. For a RAID group Y, a given Stream Group ID "X" contains all extents belonging to Write Stream ID "X" on each drive (e.g., PD) of the RAID group Y. In at least one embodiment, each of the Stream Groups across all RAID groups may be assigned a unique Stream Group ID (e.g., the Stream Group ID of a Stream Group enables unique identification of that Stream Group with respect to all Stream Groups across all RAID groups). Thus, consider a simple example including 3 RAID groups, each having 8 Stream Groups for a total of 24 Stream Groups. In this example for 24 Stream Groups, each of the Stream Groups may be associated with a unique Stream Group ID to enable each Stream Group to be distinguished and identified among all 24 Stream Groups.

In at least one embodiment in accordance with techniques herein, Write Stream detection, and thus Stream Group detection may be performed per RAID group using a clustering algorithm or technique that groups together extents of the same RAID group having similar write activity or workload and similar locality of reference (e.g., similar logical addresses or logical address proximity as may be denoted by relatively close or adjacent extent IDs). A cluster as determined using a clustering algorithm is a Stream Group that includes all extents of the same RAID group ID having similar locality of reference (e.g., based on Extent IDs) and similar write activity during the sampling period. Consistent with description elsewhere herein, adjacent extent IDs are logically adjacent to one another in the aggregated LBA range 102. For example extent IDs E1, E1 and E2 are logically adjacent to one another and form a contiguous subrange of the aggregate LBA range 102.

As known in the art, clustering algorithms include a first type or class in which an input to the algorithm is the specified number of clusters to be discovered by the algorithm. A second type or class of clustering algorithms is where the number of clusters to be produced or discovered by the algorithm is not provided as an input. Rather, with the second type, the algorithm selects the number of clusters generated. Generally, any suitable clustering algorithm of either type may be used with techniques herein.

In at least one embodiment, an algorithm of the first type of clustering algorithm noted above may be used where the algorithm is the K-Means algorithm, also known and referred to as Lloyd's algorithm. K-means is a clustering algorithm that partitions a set of points into K sets or clusters) such that the points in each cluster tend to be near each other in the plane or clustering space dimensions. The K-Means algorithm is an iterative method of cluster analysis. Initially, for a given k value, wherein "k" is the number of specified clusters to be generated or discovered by the algorithm, k random points in the plane are chosen to be the cluster centers, or centroids. Each input data point is assigned to the cluster whose centroid is closest to that point, based on Euclidean distance. Next, a new centroid are calculated for each cluster based on the mean of all the points previously assigned to that cluster. This process is repeated until convergence (centroids do not change), or until the maximum number of iterations is reached. The K-Means algorithm is well known and is described in more detail, for example, in "An Efficient k-Means Clustering Algorithm: Analysis and Implementation", Kanungo et al., IEEE Transactions on Pattern and Analysis and Machine Intelligence, Col. 24, No. 7. July 2002; and as described in the text book "Data Clustering: Algorithms and Applications", Edited by Charu C. Aggarwal, Chandan K. Reddy, Chapman and Hall/CRC Data Mining and Knowledge Discovery Series, First Edition, CRC Press, Taylor and Francis Group, LLC, 2014, ISBN-13: 978-1466558212 and ISBN-10: 1466558210; and "A comparative study of efficient initialization methods for the k-means clustering algorithm", Celebi et al, Expert Systems with Applications, Volume 40, Issue 1, January 2013, Pages 200-210.

There are several factors which make K-Means an effective choice of clustering algorithm for use with techniques herein. The first reason why K-Means may be selected, is that there is an obvious k value to choose—the maximum number of Write Streams supported by the SSD, or 'max_num_streams'. The second reason is that there are two primary attributes that all members of a Write Stream must share: proximity between logical addresses and similar write activity or frequency. Therefore, Write Streams can be formed by clustering on Extent ID and Avg. Write MB/sec per Extent. Thirdly, due to the method of Extent to RAID Group allocation described elsewhere herein, processing of the K-Means clustering may be performed independently on each RAID Group, without concern for the size of the resultant Stream Groups. This allows for the best-fit clusters to be directly utilized. Alternatively, if K-Means processing were performed on the set of all Extents, rather than on each RAID Group, an intuitive choice for the k-value may be k=max_num_streams*num_raid_groups (e.g., total number of RAID groups in system). However, in this case, the Write Streams need to be allocated or mapped to RAID Groups. Since there may be no constraint on the number of Extents per Write Stream, and each Write Stream will have varying levels of write activity, some Write Streams may need to be aggregated and/or decomposed, in order to evenly distribute data and I/O load across all drives.

In at least one embodiment in accordance with techniques herein, after each sampling period, K-Means clustering is run on two dimensions, X='Extent ID' and 'Y=Avg. (average) Write MB/sec', for each RAID Group independently. The vectors are normalized in order for each dimension to have equal weight when calculating distances. Normalization techniques are well known which adjust values measured on different scales to a common scale or range of values. Extents are clustered into k number of Stream Groups for each RAID Group. Any suitable value for "k", the number of specified clusters, provided as an input to the K-Means clustering algorithm may be selected. For example in one embodiment, the k value may satisfy 4<=k<=max_num_streams.

To demonstrate the effectiveness of K-Means algorithm, the inventors used I/O trace data (recorded I/Os such as reads and writes issued) from several storage systems to simulate the Extent allocation scheme, statistics collection, and clustering as just described. FIGS. 5, 6 7, and 8 show examples of the Stream Groups identified using the K-Means algorithm as part of processing as described herein. 'X' markers denote the cluster centers and encircled groups of data points denote the different clusters of extents and thus different Stream Group IDs for each cluster center.

Figure 5:
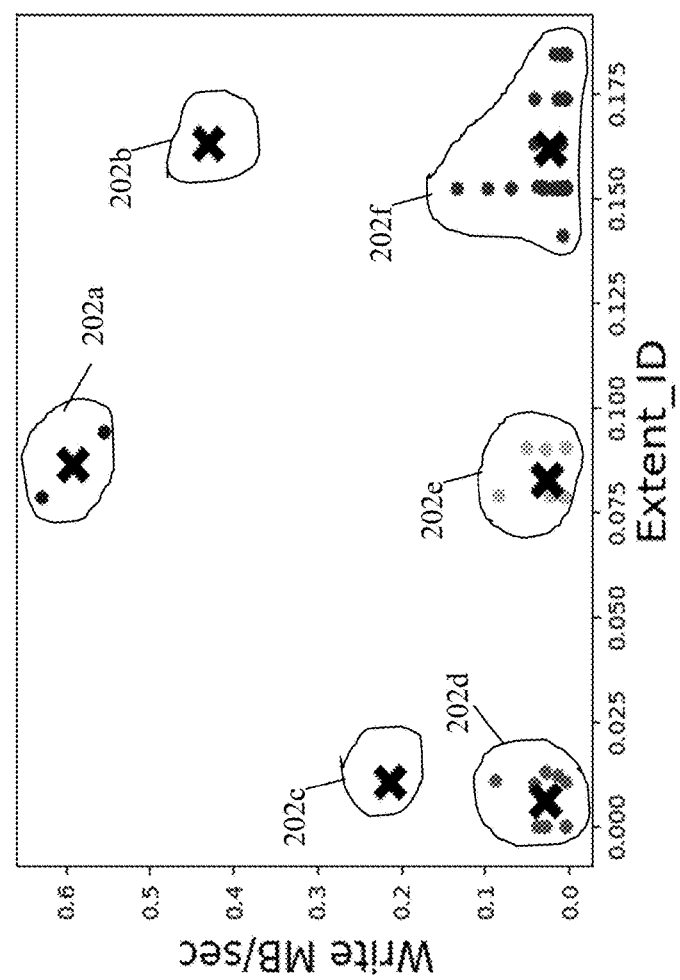
FIGS. 5, 6, 7, 8 and 9 are illustrations of clusters corresponding to Stream Groups identified using K-Means clustering in an embodiment in accordance with techniques herein.

Referring to FIG. 5, shown is a first example illustrating the clusters and thus Stream Group IDs identified using K-Means clustering for a single RAID group in an embodiment in accordance with techniques herein. The graph has a Y axis of the write activity or workload as write MB/second and the X axis of the Extent ID. Each data point thus denoted the write activity or workload for a single extent denoted by a single data point. Elements 202*a-f* denote the clusters of extents and thus the 6 different Stream Groups identified (for k=6). As noted above, the cluster center of each cluster or Stream Group of extents is denoted by an X within each of 202*a-f*.

Figure 6:
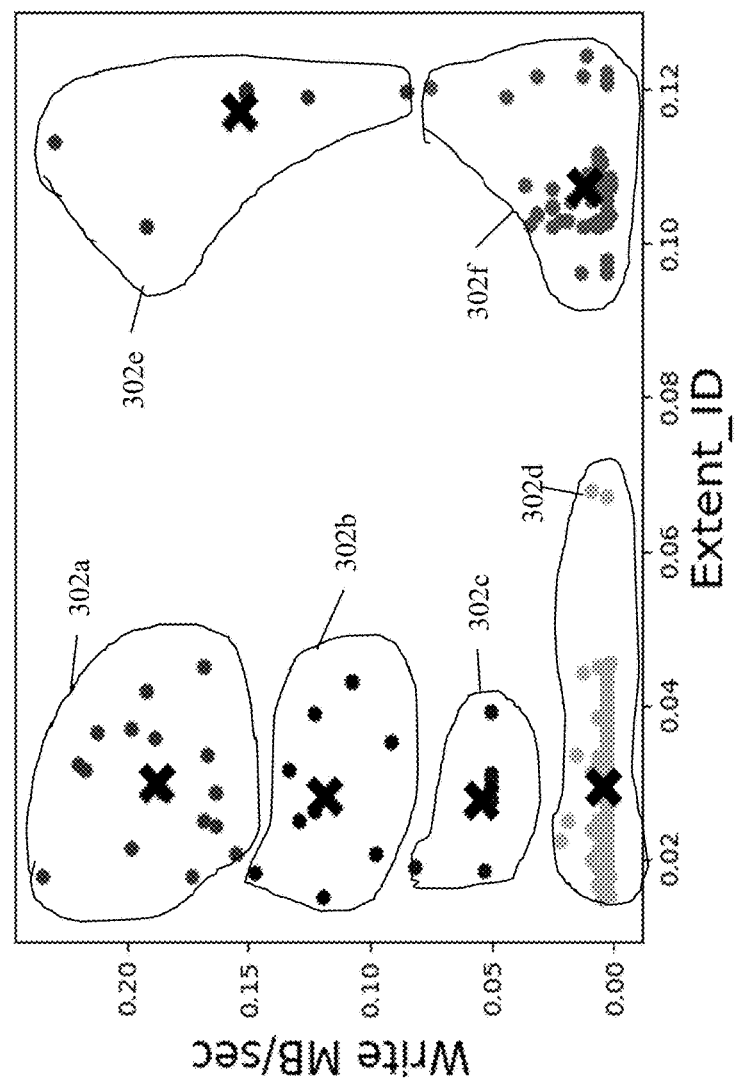

Referring to FIG. 6, shown is a second example illustrating the clusters and thus Stream Group IDs identified using K-Means clustering for a single RAID group in an embodiment in accordance with techniques herein. The graph has a Y axis of the write activity or workload as write MB/second and the X axis of the Extent ID. Each data point thus denoted the write activity or workload for a single extent denoted by a single data point. Elements 302*a-f* denote the clusters of extents and thus the 6 different Stream Groups identified (for k=6). As noted above, the cluster center of each cluster or Stream Group of extents is denoted by an X within each of 302*a-f*.

Figure 7:
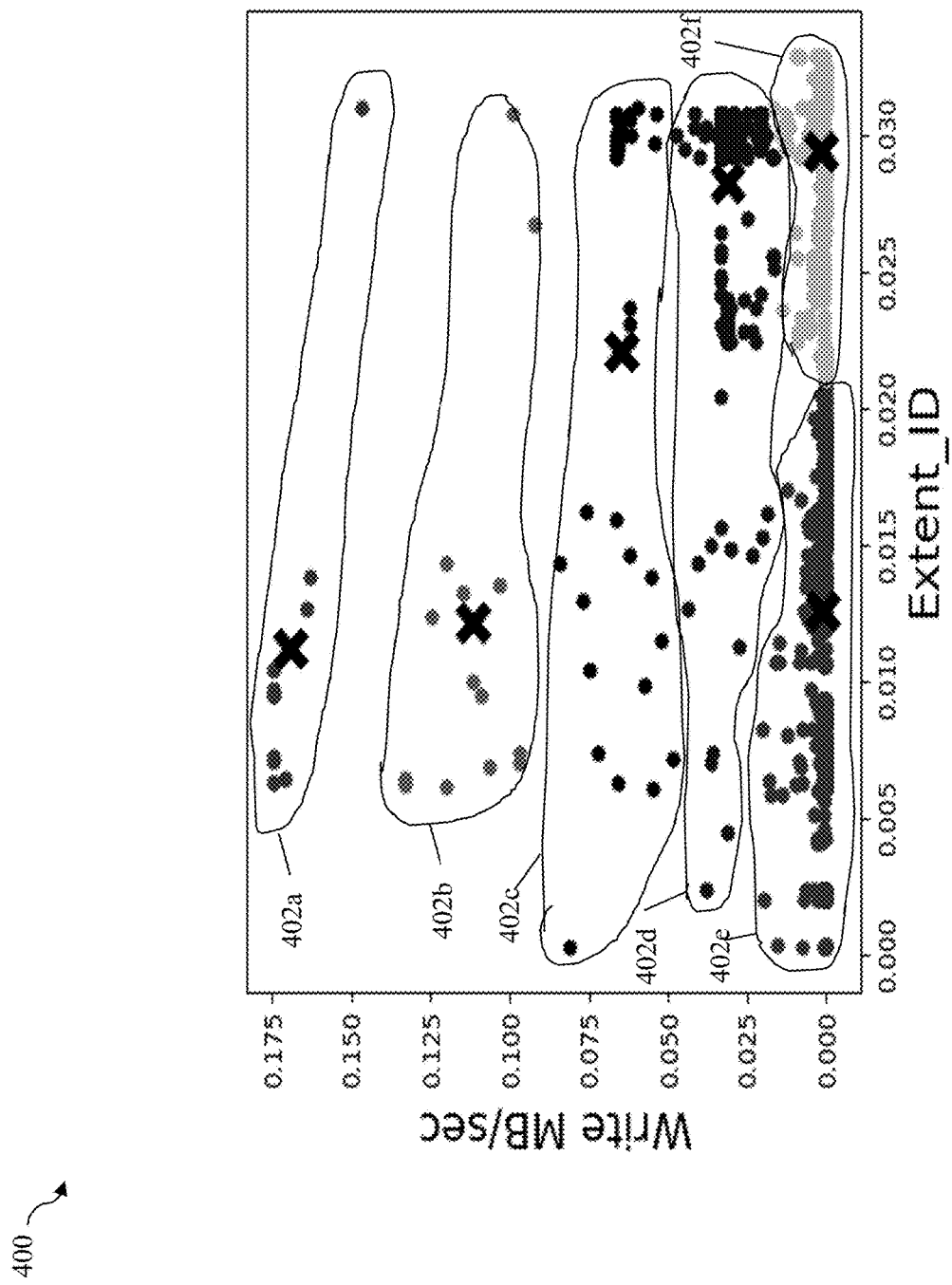

Referring to FIG. 7, shown is a third example illustrating the clusters and thus Stream Group IDs identified using K-Means clustering for a single RAID group in an embodiment in accordance with techniques herein. The graph has a Y axis of the write activity or workload as write MB/second and the X axis of the Extent ID. Each data point thus denoted the write activity or workload for a single extent denoted by a single data point. Elements 402*a-f* denote the clusters of extents and thus the 6 different Stream Groups identified (for k=6). As noted above, the cluster center of each cluster or Stream Group of extents is denoted by an X within each of 402*a-f*.

Figure 8:
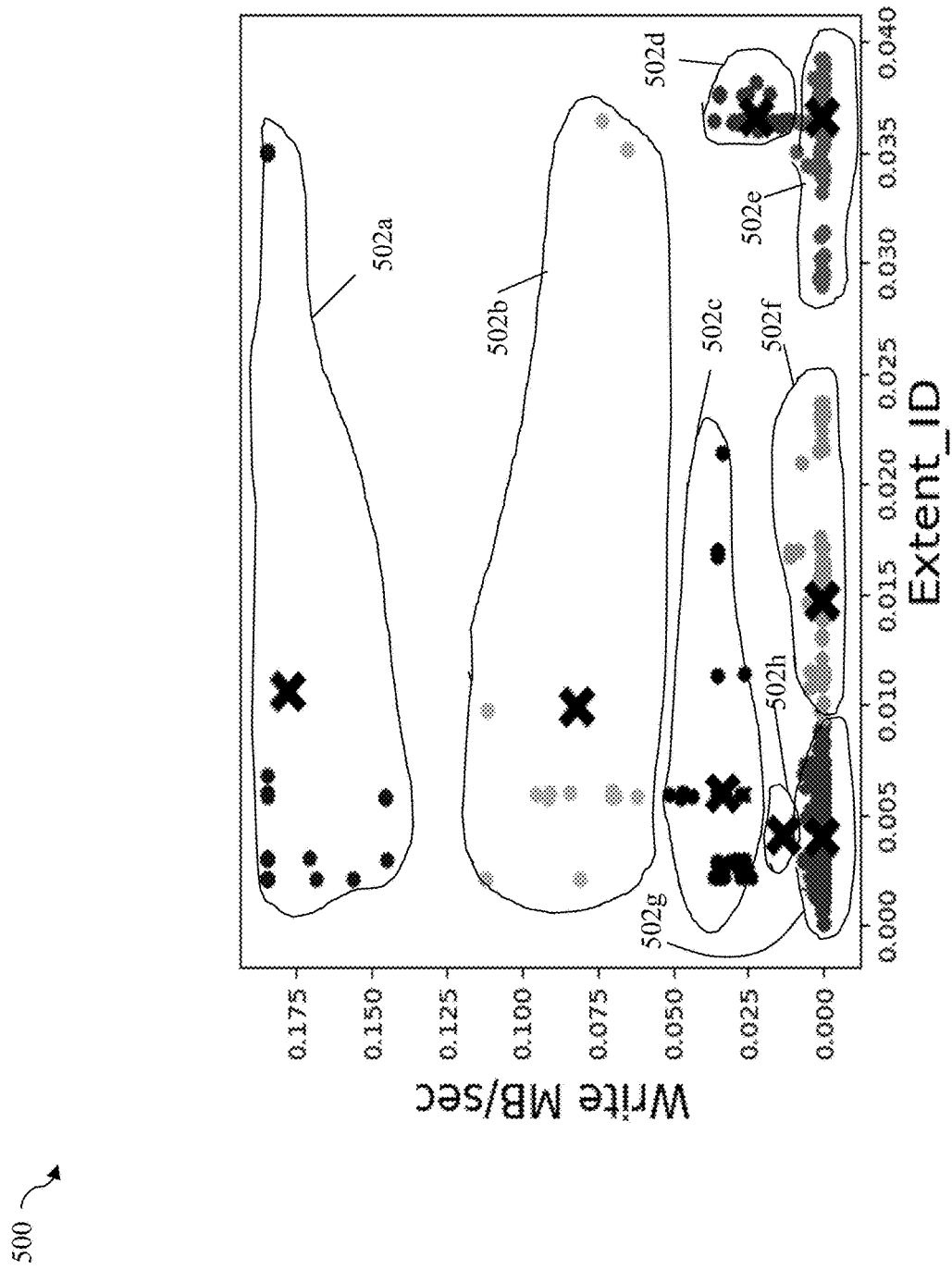

Referring to FIG. 8, shown is a fourth example illustrating the clusters and thus Stream Group IDs identified using K-Means clustering for a single RAID group in an embodiment in accordance with techniques herein. The graph has a Y axis of the write activity or workload as write MB/second and the X axis of the Extent ID. Each data point thus denoted the write activity or workload for a single extent denoted by a single data point. Elements 502*a-i* denote the clusters of extents and thus the 6 different Stream Groups identified (for k=8). As noted above, the cluster center of each cluster or Stream Group of extents is denoted by an X within each of 502*a-h*.

As noted above, an embodiment in accordance with techniques herein may generally use any suitable clustering algorithm. If using another well-known clustering algorithm, such as DBSCAN (density-based spatial clustering of applications with noise), where the number of clusters is not pre-determined, the k clusters with the largest number of members (e.g., extents) may be marked as Stream Groups, and the remaining Extents not contained within these k clusters may not be associated with any Stream.

To ensure consistent and unique identification of the Stream Groups over time (e.g., across multiple sampling periods), an embodiment in accordance with techniques herein may further perform processing as will now be described. After the first sampling period, one Extent ID, deemed the 'Reference Extent', is chosen at random from each of the k Stream Groups that were identified, such as using the K-Means or other clustering algorithm. Each Reference Extent is associated with a unique integer value in the range of 0 to k−1, which is assigned to the Stream Group ID for the Stream Group containing that Reference Extent. For future sampling windows, the Stream Group IDs are assigned based on which Reference Extent is contained within each Stream Group. In this manner, for Stream Groups which include only a single Reference Extent, that Reference Extent may be characterized as bound to the Stream Group ID. In the case of "collision" between Reference Extents (i.e. one or more Stream Groups do not contain exactly 1 Reference Extent) the Stream Group IDs associated with each Reference Extent from the Stream Groups with "collisions" are 'freed' to be later reassigned. Then, for each Stream Group not containing exactly 1 Reference Extent, a new Reference Extent is chosen at random and associated with one of the newly available Stream Group IDs.

In connection with Reference Extents "collisions" noted above for future or subsequent sampling windows, there is the additional possible outcome that a Stream Group identified as a cluster may include multiple Reference Extents (identified as Reference Extents from the immediately prior sampling window) or may alternatively include no Reference Extents. Thus, in the case where one or more Stream Groups do not contain exactly 1 Reference Extent (e.g., rather include multiple Reference Extents in the same cluster/Stream Group, or include no Reference Extent), additional processing is performed to associate or bind only a single Reference Extent and Stream Group ID with each Stream Group. In the case of a 'collision' between Reference Extents whereby multiple Reference Extents are in the same cluster/Stream Group, the Stream Group ID associated with each of the multiple Reference Extents may be deallocated or freed (e.g., not bound to the Reference Extents) and added to a set of available "free" Stream Group IDs (e.g., available or free for associating or binding with a Stream Group). Subsequently, for each Stream Group that does not contain a single Reference Extent, a new Reference Extent from the Stream Group is selected and associated with one of the "free" or available Stream Group IDs.

Figure 9:
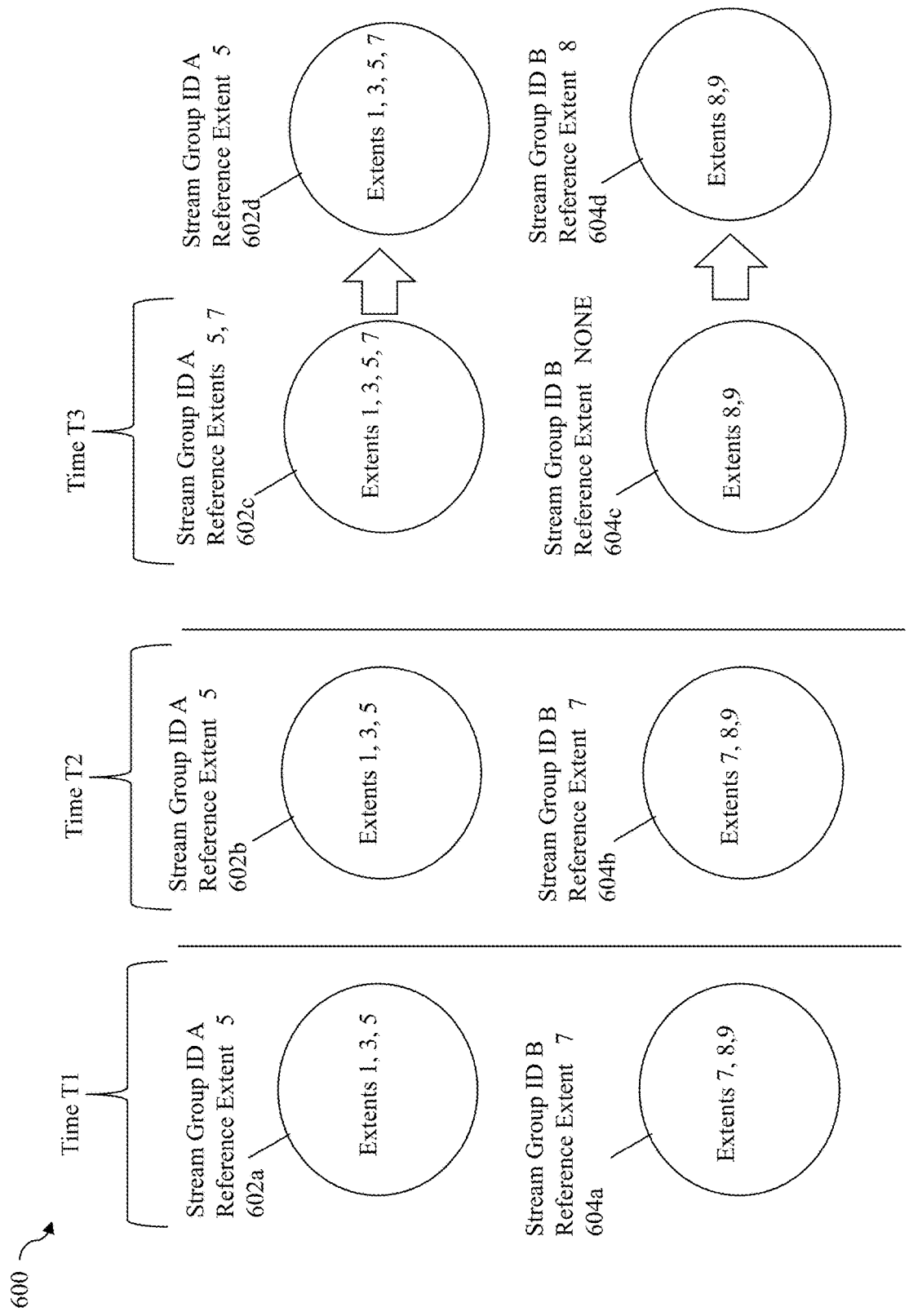

To further illustrate, reference is made to the example 600 of FIG. 9. At a first time T1 based on statistics collected on extents during a first sampling period for a single RAID group, assume that the K-Means clustering identifies two Stream Groups 602*a* and 604*a*. Stream Group ID A 602*a* includes extents 1, 3 and 5 and the Stream Group ID A has Reference Extent of 5. Stream Group ID B 604*a* includes extents 7, 8 and 9 and the Stream Group ID A has Reference Extent of 7. At a second time T2 based on statistics collected on extents during a second sampling period (subsequent to T1) for the same single RAID group, assume that the K-Means clustering again identifies two Stream Groups 602*b* and 604*b*, whereby Stream Group 602*b* includes the same extents and same Reference Extent as Stream Group 602*a* identified at prior time T1; and whereby Stream Group 604*b* includes the same extents and same Reference Extent as Stream Group 604*a* identified at prior time T1. At a third time T3 based on statistics collected on extents during a third sampling period (subsequent to T2) for the same single RAID group, assume that the K-Means clustering again identifies two Stream Groups 602*c* and 604*c*. Stream Group 602*c* includes the extents 1, 3, 5 and 7 and two Reference Extents 5 and 7 (identified at prior time T2 based on statistics from second sampling period), and Stream Group 604*c* includes no Reference Extent and includes extents 8 and 9. Thus, both Stream Groups 602*c* and 604*c* do not include exactly 1 Reference Extent. In connection with Stream Group 602*c*, processing may first "free" Stream Group ID A associated with Reference Extent 5 and also "free" Stream Group ID B associated with Reference Extent 7. At this point, both Stream Groups 602*c* and 604*c* have no Reference Extent and processing may then randomly select a new Reference Extent from each of the Stream Groups 602*c* and 604*c*. For example, Reference Extent 5 may be randomly selected as the new Reference Extent for Stream Group 602*c* thereby resulting in the Stream Group 602*d* with reference Extent 5 as shown by 602*d*. Additionally, the set of "free" or available Stream Group IDs may be {"A", "B"} whereby one of the IDs of the set is selected and associated with Stream Group 602*d*. In this example, assume that Stream Group ID "A" is selected from the set and associated with Stream Group 602*d*.

In connection with Stream Group 604*c* having no Reference Extent, one of the Extents 8 and 9 included in the Stream Group 604*c* may be randomly selected as the new Reference Extent for Stream Group 604*c*. For example, Reference Extent 8 may be randomly selected as the new Reference Extent for Stream Group 604*c* thereby resulting in the Stream Group 604*d* with reference Extent 8 as shown by 604*d*. Additionally, the set of "free" or available Stream Group IDs at this point is {"B"} whereby an ID of the set is selected and associated with Stream Group 604*d*. In this example, Stream Group ID "B" is selected from the set and associated with Stream Group 604*d*.

Figure 10:
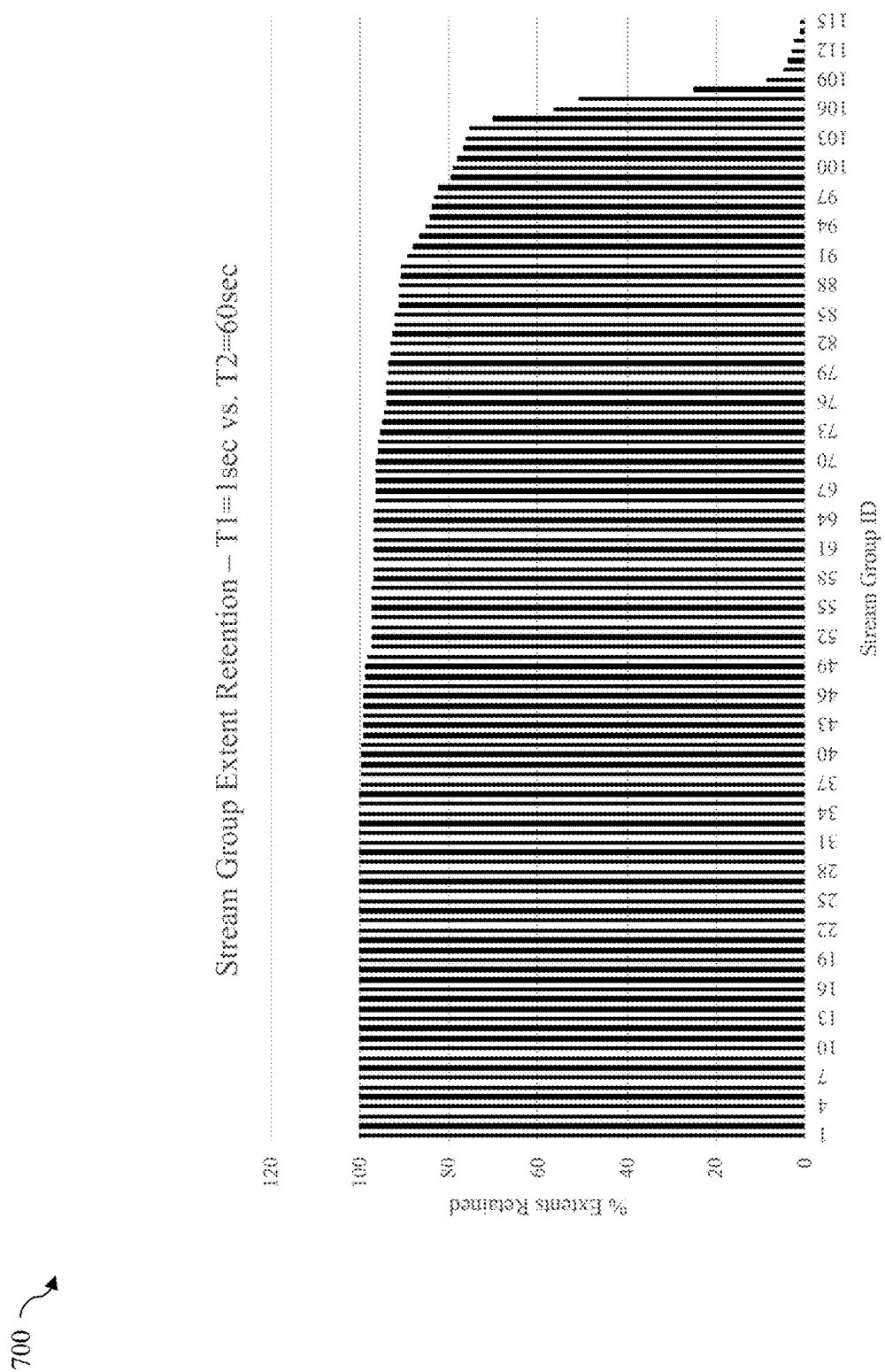
FIG. 10 is a graphical illustration of Stream Group extent retention in an embodiment using techniques herein.

Based on experimentation, the inventors observed that Extent IDs that have been clustered together during one sampling window are likely to remain clustered together for one or more subsequent sampling windows. If the write workload to a given Extent ID changes, there is a high probability that the write workload of other Extents in the same Stream Group has changed in a similar fashion. For example, reference is made to the example 700 of FIG. 10 including a graph with Stream Group ID on the X axis and % of Extents Retained between two consecutive sampling periods on the Y axis. For example, Time T1=1 second may end the first sampling period during which a first set of clusters and thus Stream Group IDs of extents is determined. Time T2=60 seconds may denote end time after one or more subsequent sampling periods in which a second set of clusters and thus Stream Group IDs of extents is again determined. The graph of 700 illustrates the percentage of extents that remained in the same cluster and thus same Stream Group ID at both times T1 and T2. As can be viewed from example 700, most of the Stream Group IDs had more than approximately 90% extent retention rate at time T2 as compared to time T1. It should be noted that the X axis of Stream Group IDs includes the collective or aggregate range of unique Stream Group IDs across all the RAID groups.

Despite lack of awareness regarding host and application attributes, techniques described herein are able to detect and utilize Write Streams per RAID group and on each SSD, in a way that does not disrupt important features such as load-balancing and RAID, which may be used in the data storage system environment. It should be noted that an embodiment in accordance with techniques herein may use one or more other metrics, in addition to, or in place of, the metric described herein to measure extent write workload. In at least one embodiment, the write metric of write MBs/second per extent may be used along with one or more additional metrics to perform clustering, such as using K-Means clustering, with higher dimensions of the vector space. For example, described above are examples (e.g., FIGS. 5, 6, 7, and 8) illustrating K-Means clustering using a two dimensional space (e.g., extent ID and write MB/second) for each extent. An embodiment may use an additional metric M also indicative of Write Stream membership in combination with the above-noted two dimensions whereby the K-Means clustering then detects clusters but within the three dimensional space (e.g., extent ID, write MB/second, and the additional metric M).

Figure 11:
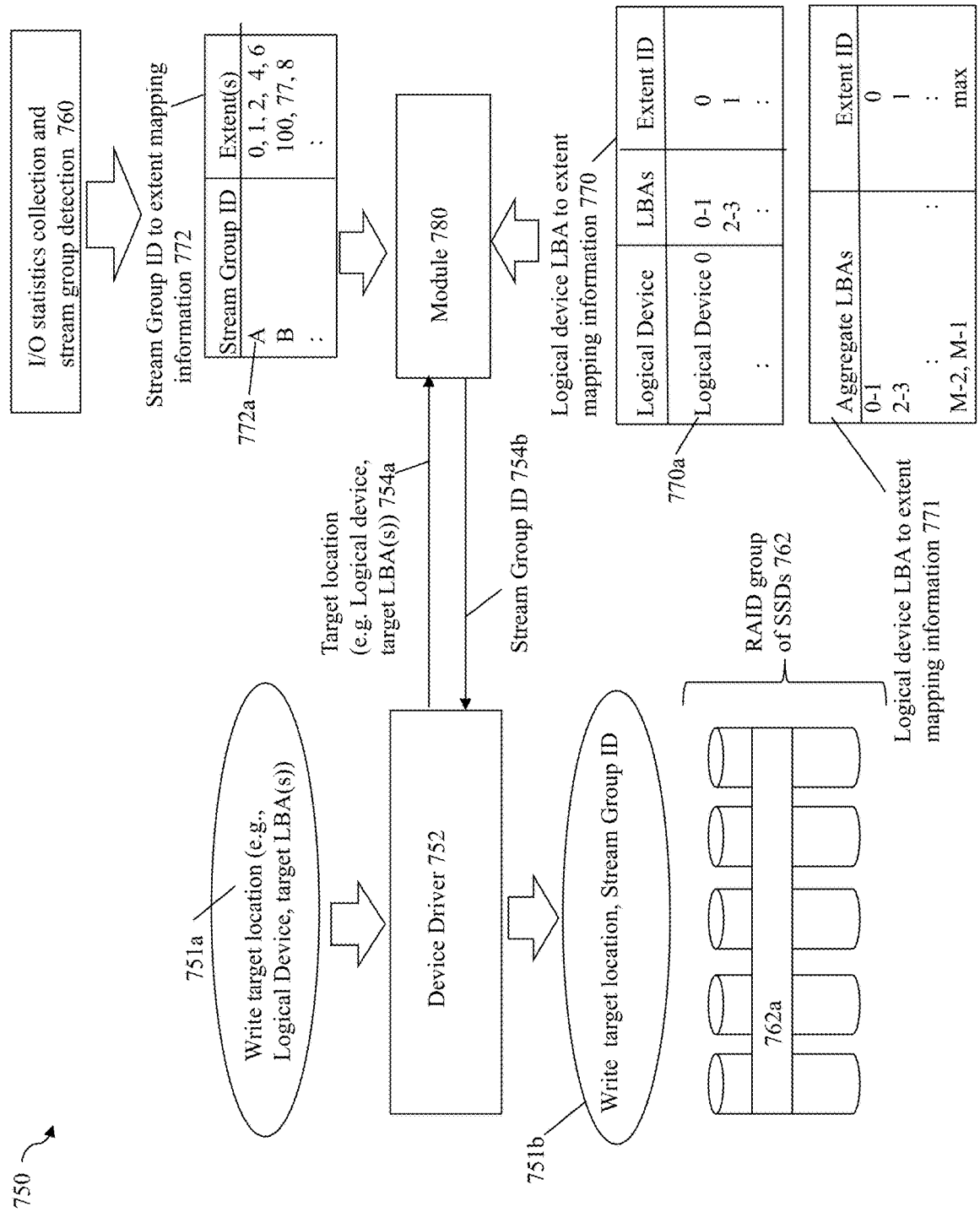
FIG. 11 is an example illustrating component and data flow in an embodiment in accordance with techniques herein.

Referring to FIG. 11, shown is an example 750 illustrating components and data flow in at least one embodiment in accordance with techniques herein. The example 750 illustrates a data flow in connection with tagging a write operation with a Stream Group ID in an embodiment in accordance with techniques herein.

The example 750 includes I/O statistics collection and Stream Group detection module 760 may, for each sample period, collect the I/O statistics and perform processing to detect the different the Stream Groups for each RAID group. Processing performed by module 760 may include executing the K-Means or other clustering algorithm as described herein to detect clusters corresponding to the different Stream Groups. As an output, the module 760 may create and update the Stream Group ID to extent mapping information 772 which identifies the extent IDs of extents included in each of the different Stream Groups (each denoted by a unique Stream Group ID).

The example 750 also includes logical device LBA to extent mapping information 770 which identifies the mapping between extent IDs and logical device LBAs. For example, the mapping information 770 denotes the mapping of extent IDs 110 to the different logical device LBA ranges of 106.

The example 750 includes a write operation 751*a* that may be issued, for example, by a host or other client of the data storage system. The write operation 751*a* may write data to a target location that is a logical device and one or more target LBAs in the logical device's address space (e.g., target LBAs in one of the logical device address spaces of 106). The write operation 751*a* may be received by a device driver 752, or more generally, any other suitable component in the I/O or data path that may performing the tagging of the write operation with a write stream ID. In response to receiving the write 571*a*, the device driver 752 may issue a request of another component or module 780 to return the Stream Group ID 754*b* corresponding to the target location 754*a* of the write operation 751*a*. In response to receiving the target location 754*a* denoting a logical device and target LBA(s), the module 780 may perform processing that will now be described. The module 780 may first determine the extent ID of the extent that includes, or maps to, the target location. For example, assume the target location is logical device 0, LBA 1, the module 780 may use mapping information 770 to determine that extent ID 0 includes, or is mapped to logical device 0, LBA 1 via entry or row 770*a*. Once the extent ID 0 is determined using the table 770, the module 780 may then determine which Stream Group ID is mapped to the extent ID 0 (e.g., determine the Stream Group ID of the Stream Group that includes extent ID 0). In this example, module 780 may use the Stream Group ID to extent mapping information 772 to determine that Stream Group ID A is mapped to extent ID 0 (as indicated by row or entry 772a). Module 780 may return the Stream Group ID 754a, which in this example is Stream Group ID A, to the device driver 752. As denoted by the tagged write I/O 751b, the device driver 752 may then tag the write I/O 751b with the Stream Group ID returned from the module 780 and send the write I/O 751b to one or more of the SSDs 762 to store the write data in accordance with the particular RAID level and configuration of the RAID group 762 of SSDs. As described herein, each extent may be striped across all PDs of the RAID group. For example, element 762a may denote the extent ID 0 data that is striped across the 5 PDs of the RAID group of SSDs 762. The device driver 752, or other modules or components not illustrated, may map the target location of 751b to its corresponding physical location(s) on one or more of the SSDs 762 and then store data to the physical location(s). For example, if the RAID group 762 is a 3+1 or 4+1 RAID-5 configuration, storing the data of 751b may include storing the write data and also updated parity information on multiple ones of the SSDs of 762. Thus, the single write 751b may further result in multiple writes to more than one of the SSDs of 762 depending on the particular RAID level and configuration.

It should be noted that the target location of the write 751a is expressed in terms of a logical device and LBA(s) in the logical device's address space. As a variation, an embodiment in accordance with techniques herein may rather convert such a form of a target location into another target location that specifies a logical address of the aggregate LBA range 102. In such an embodiment, the mapping information 771 may be used rather than 770 to map the target location expressed in terms of LBAs of the aggregate LBA range 102 to extent IDs.

Figure 12:
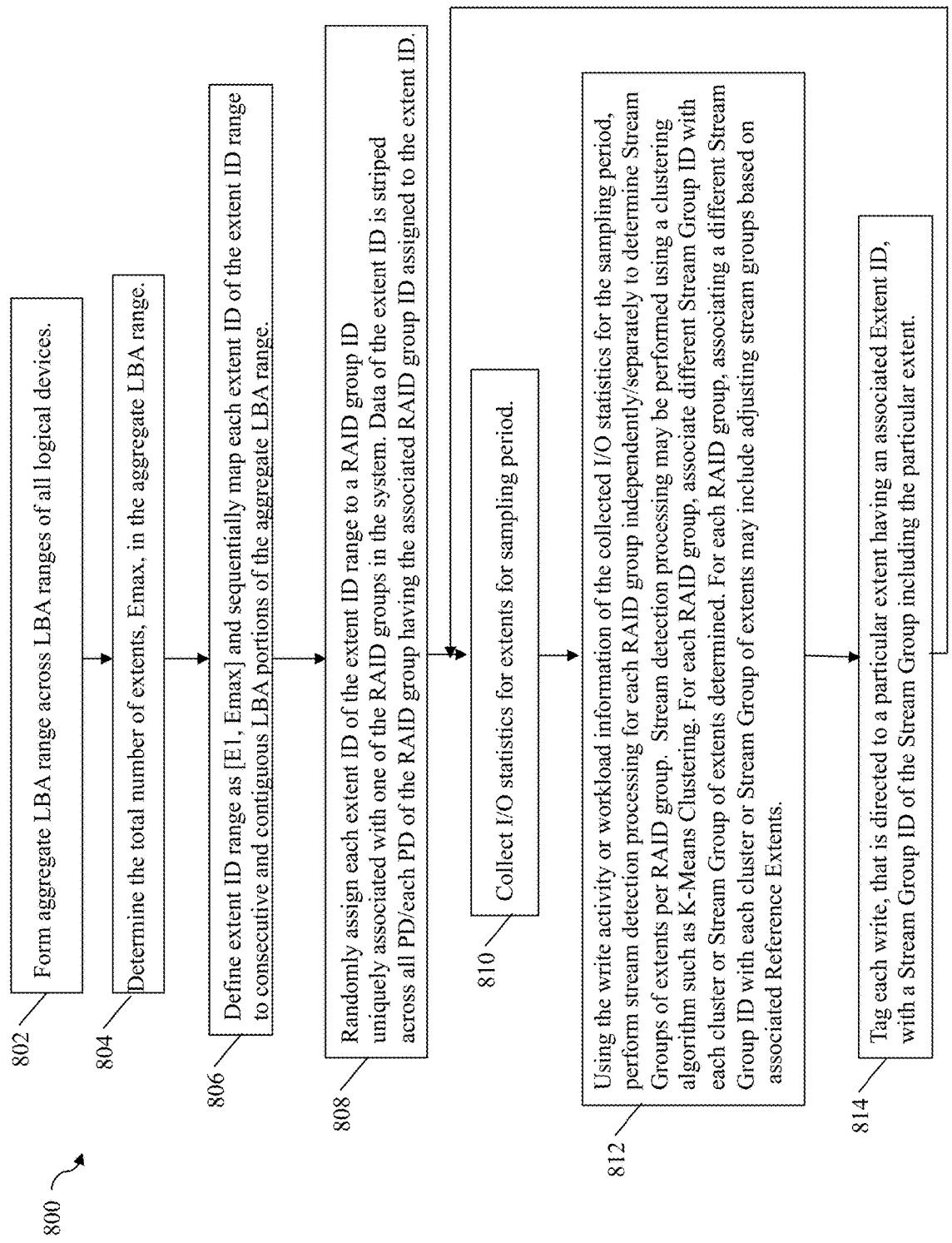
FIG. 12 is a flowchart of processing steps that may be performed in an embodiment in accordance with techniques herein.

Referring to FIG. 12, shown is a flowchart of processing steps that may be performed in an embodiment in accordance with techniques herein. The flowchart 800 summarizes processing described above. At step 802, an aggregate LBA range is formed across the LBA ranges of all logical devices. Step 802 processing is described above, for example, in connection with FIG. 3. From step 802, processing proceeds to step 804. In step 804, the total number of extents Emax in the aggregate LBA range may be determined. Step 804 processing is described above, for example, in connection with FIG. 3. From step 804, processing proceeds to step 806. In step 806, the extent ID range may be defined as [E0, Emax] and processing may sequentially map each extent ID of the extent ID range to consecutive and contiguous LBA portions of the aggregate LBA range. From step 806, processing proceeds to step 808. In step 808, processing is performed to randomly assign each extent ID of the extent ID range to a RAID group ID uniquely associated with one of the RAID groups in the system. Data of the extent ID is striped across all PDs/each PD of the RAID group having the associated RAID group ID assigned to the extent ID. From step 808, processing proceeds to step 810 where statistics are I/O statistics are collected for each of the extents for a sampling period. Once the sampling period concludes, processing proceeds from step 810 to step 812. In step 812, using the write activity or workload information of the collected I/O statistics for the sampling period, stream detection processing is performed independently or separately for each RAID group to determine Stream Groups of extents per RAID group. Stream detection processing may be performed using a clustering algorithm such as K-Means Clustering. For example, for each single RAID group, the K-Means clustering algorithm may be independently executed to determine "k" clusters and thus Stream Groups of extents of that single RAID group. A different Stream Group ID is associated with each cluster or Stream Group of extents determined by step 812. Step 812 may also include adjusting Stream Groups of each RAID group over time such as described, for example, in connection FIG. 9. In connection with step 812 for each RAID group, associating a different Stream Group ID with each cluster or Stream Group of extents may include adjusting stream groups based on selected Reference Extents (e.g., as in FIG. 9). From step 812, processing proceeds to step 814. In step 814, processing is performed to tag each write with a Stream Group ID. The write is directed to a target location having its data stored on one or more SSDs such as of a RAID group. The target location may be a target logical device and target address such as one or more LBAs of the target logical device's address space. In step 814, for each write received directed to such a target location, processing determines the extent ID of the extent including the target location, determines the Stream Group ID of the Stream Group including the extent ID, and then tags the write with the Stream Group ID. As described herein, the tagged write may then be issued to the SSD which uses the Stream Group ID in connection with placement of the write data on the SSD's physical storage media whereby different portions of write data having the same Stream Group ID are stored in the same SSD physical storage block, or more generally, same SSD storage allocation unit. Consistent with discussion herein and also known in the art, the storage allocation unit may denote the unit or granularity in which different SSD operations (e.g., allocation of physical storage of the SSD, erasures of content of physical storage of the SSD, and the like) are performed. From step 814, control proceeds to step 810 for processing associated with the next sampling period.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
randomly assigning a plurality of extent identifiers to a plurality of RAID (redundant array of independent disks) groups, wherein each of the plurality of extent identifiers denotes a different one of a plurality of extents;
receiving first write activity information for the plurality of extents for a first sampling period;
for each of the plurality of RAID groups, performing stream detection processing in accordance with the first write activity information and determining a plurality of stream groups, wherein each of the plurality of stream groups for each of the plurality of RAID groups includes extents of said each RAID group belonging to a same write stream in said each RAID group, wherein each of the plurality of stream groups of each of the plurality of RAID groups is uniquely identified using one of a plurality of stream group identifiers;
tagging a write operation directed to one of the plurality of extents with a first of the plurality of stream group identifiers denoting a stream group including the one extent; and
issuing the write operation to a solid state drive of one of the plurality of RAID groups.

2. The method of claim 1, wherein said stream detection processing for a first of the plurality of RAID groups includes:
determining, using a clustering algorithm and in accordance with the first write activity information, a plurality of clusters of extents of the first RAID group, wherein each of the plurality of clusters of extents of the first RAID group identifies a different write stream of extents of the first RAID group.

3. The method of claim 2, wherein the clustering algorithm is a k-means clustering algorithm.

4. The method of claim 2, wherein each of the plurality of clusters of extents of the first RAID group includes extents of the first RAID group determined by the clustering algorithm as similar with respect to a plurality of dimensions.

5. The method of claim 4, wherein the plurality of dimensions include extent identifier and write activity.

6. The method of claim 5, wherein each of the plurality of clusters of extents of the first RAID group includes extents of the first RAID group determined by the clustering algorithm to have similar write activity and also similar locality of reference based on extent identifiers associated with extents of said each cluster.

7. The method of claim 6, wherein the first write activity information for each of the plurality of extents includes an amount of data written to said each extent per unit of time during the first sampling period.

8. The method of claim 1, further comprising:
forming an aggregate LBA (logical block address range) across contiguous LBA ranges of a plurality of logical devices; and
sequentially mapping portions of the aggregate LBA range to an extent range of the plurality of extent identifiers.

9. The method of claim 1, wherein a plurality of write operations includes the write operation and each of the plurality of write operations is tagged with the first stream group identifier, and the method includes:
issuing the plurality of writes to the solid state drive that stores write data from the plurality of write operations in a same allocation block.

10. The method of claim 1, further comprising:
receiving second write activity information for the plurality of extents for a second sampling period subsequent to the first sampling period;
for each of the plurality of RAID groups, performing stream detection processing in accordance with the second write activity information and determining a second plurality of stream groups, wherein each of the second plurality of stream groups for each of the plurality of RAID groups includes extents of said each RAID group belonging to a same write stream in said each RAID group, wherein each of the second plurality of stream groups of each of the plurality of RAID groups is uniquely identified using one of the plurality of stream group identifiers;
tagging a second write operation directed to a second of the plurality of extents with a second of the plurality of stream group identifiers denoting a stream group including the second extent; and
issuing the second write operation to the solid state drive.

11. The method of claim 1, wherein each of the plurality of extents assigned to each of the plurality of RAID groups is striped across all physical storage devices of said each RAID group.

12. A system comprising:
a processor; and
a memory comprising code stored thereon that, when executed, performs a method of processing I/O operations comprising:
randomly assigning a plurality of extent identifiers to a plurality of RAID (redundant array of independent disks) groups, wherein each of the plurality of extent identifiers denotes a different one of a plurality of extents;
receiving first write activity information for the plurality of extents for a first sampling period;
for each of the plurality of RAID groups, performing stream detection processing in accordance with the first write activity information and determining a plurality of stream groups, wherein each of the plurality of stream groups for each of the plurality of RAID groups includes extents of said each RAID group belonging to a same write stream in said each RAID group, wherein each of the plurality of stream groups of each of the plurality of RAID groups is uniquely identified using one of a plurality of stream group identifiers;
tagging a write operation directed to one of the plurality of extents with a first of the plurality of stream group identifiers denoting a stream group including the one extent; and
issuing the write operation to a solid state drive of one of the plurality of RAID groups.

13. A non-transitory computer readable medium comprising code stored thereon that, when executed, performs a method of processing I/O operations comprising:
randomly assigning a plurality of extent identifiers to a plurality of RAID (redundant array of independent disks) groups, wherein each of the plurality of extent identifiers denotes a different one of a plurality of extents;
receiving first write activity information for the plurality of extents for a first sampling period;
for each of the plurality of RAID groups, performing stream detection processing in accordance with the first write activity information and determining a plurality of stream groups, wherein each of the plurality of stream groups for each of the plurality of RAID groups includes extents of said each RAID group belonging to a same write stream in said each RAID group, wherein each of the plurality of stream groups of each of the plurality of RAID groups is uniquely identified using one of a plurality of stream group identifiers;
tagging a write operation directed to one of the plurality of extents with a first of the plurality of stream group identifiers denoting a stream group including the one extent; and
issuing the write operation to a solid state drive of one of the plurality of RAID groups.

14. The non-transitory computer readable medium of claim 13, wherein said stream detection processing for a first of the plurality of RAID groups includes:
determining, using a clustering algorithm and in accordance with the first write activity information, a plurality of clusters of extents of the first RAID group, wherein each of the plurality of clusters of extents of the first RAID group identifies a different write stream of extents of the first RAID group.

15. The non-transitory computer readable medium of claim 14, wherein the clustering algorithm is a k-means clustering algorithm.

16. The non-transitory computer readable medium of claim 14, wherein each of the plurality of clusters of extents of the first RAID group includes extents of the first RAID group determined by the clustering algorithm as similar with respect to a plurality of dimensions.

17. The non-transitory computer readable medium of claim 16, wherein the plurality of dimensions include extent identifier and write activity.

18. The non-transitory computer readable medium of claim 17, wherein each of the plurality of clusters of extents of the first RAID group includes extents of the first RAID group determined by the clustering algorithm to have similar write activity and also similar locality of reference based on extent identifiers associated with extents of said each cluster.

19. The non-transitory computer readable medium of claim 18, wherein the first write activity information for each of the plurality of extents includes an amount of data written to said each extent per unit of time during the first sampling period.

20. The non-transitory computer readable medium of claim 14, wherein the method includes:
    forming an aggregate LBA (logical block address range) across contiguous LBA ranges of a plurality of logical devices; and
    sequentially mapping portions of the aggregate LBA range to an extent range of the plurality of extent identifiers.

* * * * *